Patented Feb. 12, 1935

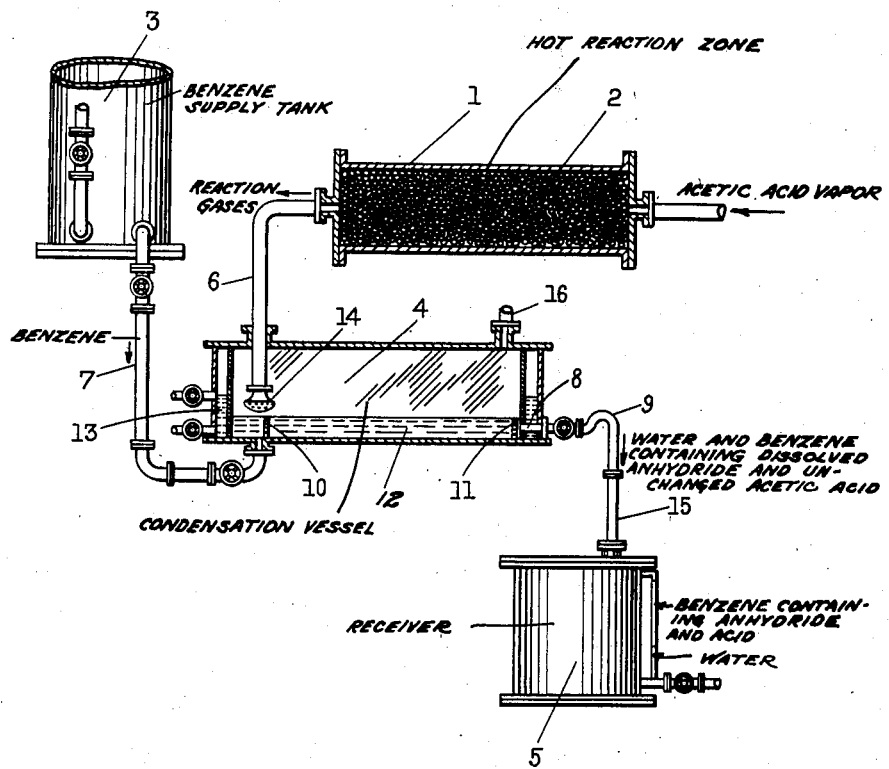

1,990,902

UNITED STATES PATENT OFFICE 1,990,902

MANUFACTURE OF ALIPHATIC ACID ANHYDRIDES

Stanley Joseph Green, Spondon, near Derby, England, assignor to Celanese Corporation of America, a corporation of Delaware Application January 5, 1929, Serial No. 330,578
In Great Britain January 28, 1928

10 Claims. (Cl. 260—123)

This invention relates to the manufacture of aliphatic anhydrides from aliphatic acids and especially to the manufacture of acetic anhydride from acetic acid.

In Bulletin de la Société Chimique de France, vol. XXXI, pages 113–118, experiments are described by Peytral wherein acetic acid vapour is passed through platinum tubes heated to 1150° C. In these experiments when the acid vapour was passed in a rapid stream, small quantities (less than 2%) of acetic anhydride were obtained and the decomposition to methane or other gaseous products was small, the major part of the acetic acid being recovered unchanged on condensation of the reaction gases or vapours; with decreased speed of passage of the acetic acid vapour, however, no acetic anhydride was produced and considerable quantities of gaseous decomposition products (e. g. methane, acetylene, carbon dioxide, hydrogen, carbon monoxide) were formed. It would seem from these experiments that in the case where acetic anhydride was produced with but small decomposition to gaseous products the acetic acid vapour was passed through the tube much too fast to allow it to attain a temperature of 1150° C., and that when, owing to slower passage of the acetic acid vapour, the acetic acid vapour was allowed to attain higher temperatures, the reaction was more violent and the sole products of the reaction were gases such as methane, $CO_2$, CO etc. Experiments have confirmed this view and I have found that when passing acetic acid vapour through heated platinum tubes in such manner that the acetic acid vapour is allowed to attain temperatures of even 700° to 800° C. very considerable decomposition to gaseous products occurs. It is therefore evident that when Peytral produced acetic anhydride with but slight decomposition to gaseous products, the acetic acid vapour must only have attained a temperature below 700° to 800° C.

Since the publication of Peytral's experiments various proposals have been made in patent and other literature in regard to the production of aliphatic anhydrides by subjecting aliphatic acids to the action of heat, and various catalysts have been proposed for the reaction. It has however been generally assumed that the presence of carbon in the reaction zone has a very deleterious influence on the reaction. For instance in German Patent No. 408,715 and French Patent 563,452 it is stated that carbon should be excluded from the reaction zone as it leads to profound decomposition of the acid vapour to gaseous products; and in Gmelin (Handbuch der organischen Chemie IV Auflage. Band. I, page 624) it is stated that on passing acetic acid vapour through a tube heated to dull red heat in presence of carbon, complete decomposition to $CO_2$, methane, acetone and inflammable oils takes place. Further in many publications it has been stated that the reaction to anhydride is hindered or stopped by decomposition to carbon which becomes deposited on the catalyst or in the reaction zone, and in many such publications proposals have been made as to methods of removing the carbon to enable the reaction to proceed.

I have now made the surprising discovery that carbons produced by the decomposition of organic substances under the action of heat, and especially sugar charcoal are highly useful catalysts for the reaction. This is especially surprising as carbons (possibly owing to their graphitic nature or owing to the impurities) produced by the decomposition of mineral carbonaceous materials, such as coal (e. g. retort carbon, coke or the like) are useless as catalysts for the reaction.

According to the present invention therefore I produce aliphatic anhydrides (and especially acetic anhydride) by passing aliphatic acid vapour (and especially acetic acid vapour) over or otherwise in contact with a heated catalyst mass comprising non-crystalline carbon produced by the charring or destructive heating of organic substances, and especially comprising sugar charcoal (i. e. carbon produced by the charring or decomposition of sugar under the action of heat). It is to be understood that where I speak of non-crystalline carbons produced by the charring or destructive heating of organic substances I do not limit myself to the employment of the carbons produced simply by such charring or heating and that I include the use of carbons which have been purified subsequent to such charring or heating, for instance, I may subject lamp-black to extraction treatment to remove mineral oil prior to using this carbon as a catalyst.

The catalyst mass may, if desired, be composed entirely of the carbon or may contain in admixture any catalysts known to promote the scission of aliphatic acids into their anhydrides. For instance the catalyst may be composed of a mixture of the carbon (and especially the sugar charcoal above referred to) in admixture with tungstic acid and/or one or more tungstates (other than alkali tungstates), especially calcium, magnesium or other alkali earth metal tungstates, or sodium metaphosphate or one or more phosphoric acids.

The reaction may be performed at temperatures of from about 400° to 700° C. and especially at temperatures of from about 550° to 650° C.

The carbon may of course be produced by the charring or destructive heating of the organic substance in any suitable way. Conveniently where the desired catalyst is to contain further catalyst in admixture with the carbon, such further catalyst—or a substance capable of yielding the same on heating—may in many cases be mixed with the organic substance and the resulting mixture subjected to charring or destructive heating. For instance a highly useful catalyst mass of carbon and sodium metaphosphate may be prepared by the charring or destructive heating of a solution of sugar containing dihydrogen sodium phosphate or containing microcosmic salt or a mixture of sugar and sodium phosphate or dihydrogen sodium phosphate or microcosmic salt.

The acetic acid vapour, or other aliphatic acid vapour, may be subjected to the reaction in any suitable manner. Conveniently it may be passed in a rapid stream through any convenient form of apparatus (for instance one or more tubes or other reaction vessels) containing the catalyst and heated to the desired temperature. The tubes or other form of apparatus may be made of or lined with any suitable material, such for instance as fused silica, copper, gold, graphite or certain alloy steels. Instead of heating the tubes or other forms of apparatus the necessary heat may be applied directly to the catalyst, for instance by heating the same electrically.

I have found that by performing the process under reduced pressure or "vacuum" and/or by diluting the aliphatic acid vapour with gases (for instance nitrogen, carbon dioxide or the like) decomposition to gaseous products may often be avoided and higher efficiency obtained. It will however be understood that I do not limit myself in regard to the pressure to be employed in the process.

The anhydride produced by the process may be separated and recovered from the reaction gases or vapours in any suitable way. In order to avoid hydrolysis and consequent loss of anhydride the vapours are preferably not submitted to simple condensation but are treated to separate the anhydride from the water vapour present or formed in the reaction. For instance the gases or vapours from the reaction zone may be subjected to separation in the manner described and claimed in British Patent No. 303,772 and corresponding United States application S. No. 284,566 filed 11 June 1928, that is to say the anhydride may be condensed from the reaction vapours whilst carrying away the water by the vapour of one or more entraining liquids. In such form of execution the reaction vapours are preferably mixed after leaving the reaction zone with the vapours of the entraining liquid or liquids at a temperature below the boiling point (under the conditions of pressure obtaining) of the anhydride. Conveniently such mixing may be performed by introducing the reaction vapours (which should not be allowed to cool below the boiling point of water before becoming mixed with the vapours of the entraining liquid or liquids) into a vessel up which the vapours of the entraining liquid or liquids are caused to rise; by this means the anhydride may be substantially condensed and the water vapour carried away with the vapours of the entraining liquid or liquids. Examples of entraining liquids which I may use for such method of condensation are benzene, carbon tetrachloride, petrol, mixtures of two or more of such bodies, or mixtures of ether and petroleum ether; it will be understood however, that any other liquids chemically inert to the anhydride and having a high entraining capacity for water may be employed. The liquids should preferably have a low entraining capacity for the anhydride.

Or, for instance, the reaction vapours may be subjected to condensation by the method described and claimed in British Patent No. 298,667 and corresponding United States Patent No. 1,931,687, that is to say they may be subjected to condensation by leading them under the surface of an "extracting" liquid cooled down or otherwise kept at temperatures below (and preferably considerably below) the boiling point of water. By Patent No. 298,667 the term "extracting liquid" is meant a liquid or liquid mixture in which the anhydride is soluble and which is chemically inert to the anhydride and insoluble or substantially insoluble in water. As examples of such "extracting" liquids may be mentioned benzene, chloroform and mixtures of ethyl ether or chloroform with one or more hydrocarbons such as light paraffins, gasoline, kerosene, benzol or its homologues. It is preferable to use as "extracting" liquids, liquids of the character referred to which are themselves hydrocarbons or which contain hydrocarbons, for example benzene or mixtures of ethyl ether or chloroform with one or more hydrocarbons such as paraffins (particularly the petroleum fraction of boiling point 40° to 70° C. termed petroleum ether), gasoline (boiling point 70° to 90° C.), kerosene, benzol or its homologues. The following particular examples of "extracting" liquids are very suitable:—ether in admixture with petroleum ether, chloroform mixed with petroleum ether and/or gasoline; and mixtures of ether and petroleum ether containing about 30 to 50% petroleum ether are especially suitable.

Or, for instance, the reaction vapours may be subjected to condensation by the method described in British Patent No. 310,863; i. e. the reaction vapours may be caused to impinge upon a flowing stream of benzene (or other water insoluble solvent for the anhydride) whereby said vapours are quickly cooled and condensed and the anhydride separated from the water. The benzene or the like so employed may be collected and the water layer (usually the lower layer) which separates out may be removed and the benzene (or equivalent) layer distilled to recover the anhydride.

Or, for instance, the anhydride may be separated from the reaction vapours by the method described in U. S. Patent No. 1,735,957, i. e. they may be subjected to fractional condensation immediately on leaving the hot reaction zone, for instance, they may be passed up one or more fractionating columns whereby the anhydride is condensed and the water allowed to pass on in vapour form.

It will of course be understood that in cases where the reaction is performed under pressures higher than atmospheric pressure, the reaction gases or vapours should, prior to treatment for separation or recovery of the anhydride, preferably be passed through suitable apparatus (for instance one or more reducing valves) wherein the pressure is reduced substantially to normal atmospheric pressure.

It will be understood that the invention is not limited as to the strength of aliphatic acid employed. The process can be performed even with the vapours of dilute acids; and besides affording a ready means for the manufacture of anhydrides from concentrated or highly concentrated acids, it affords valuable means for producing anhydrides from waste or dilute acids, especially waste or dilute acetic acids such as result from the acetylation of cellulose or other industrial acetylation processes.

The following examples serve to illustrate some forms of execution of the process, it being understood that they are given only by way of illustration and are in no way limitative.

Example 1

Glacial acetic acid is boiled and the resulting vapours passed in a rapid stream through a tube (composed of or lined with copper, silver, gold or platinum) containing a catalyst mass composed of carbon produced by charring or destructive heating of sugar, the catalyst mass being heated to 600° to 700° C. The gases or vapours on leaving the tube are caused to impinge on a flowing stream of cold benzene whereby they are quickly cooled and condensed. The benzene stream is collected in a suitable vessel and the water layer (usually the bottom layer) separated therefrom, and the benzene layer (usually the top layer) fractionally distilled to recover the acetic anhydride.

Example 2

A catalyst mass is prepared by charring in any suitable manner a mixture of microcosmic salt and cane sugar. The resulting catalyst mass is placed in a suitable tube (for instance a tube such as described in Example 1). Acetic acid vapour, produced from glacial acetic, is passed in a rapid stream through the tube which is heated to 500° to 700° C. and the gases or vapours are treated as in Example 1 to separate and recover the acetic anhydride.

Example 3

The vapours produced by boiling glacial acetic acid are passed in a rapid stream through a suitable tube (for instance a tube such as described in Example 1) containing a catalyst mass composed of a mixture of calcium tungstate and sugar charcoal, the tube being heated to 500° to 700° C. The gases or vapours from the reaction zone are treated as in Example 1 to separate and recover the acetic anhydride.

The accompanying drawing serves to illustrate a convenient form of apparatus for executing the invention in accordance with the above examples. In the form of apparatus shown a copper reaction tube is employed, but it will of course be understood that this reaction tube may be replaced by any other suitable tube referred to in the above examples.

Referring to the drawing 1 is the reaction tube composed of copper and filled with the catalyst mass 2 described in Examples 1, 2 or 3. 3 is a supply tank containing benzene. 4 is a jacketed condensation vessel and 5 a receiver.

In operation the acetic acid vapour is passed in a rapid stream through the copper tube 1 this tube being heated to a temperature between 500° and 700° C. From the tube 1 the vapours pass via the pipe 6 to the condensation vessel 4. Benzene is run from the supply tank 3 via the pipe 7 to the condensation vessel 4 across which vessel the benzene passes in a rapid stream to the outlet pipe 8. The outlet pipe 8 is provided with a constant level overflow 9 serving to maintain a substantially constant level in the vessel 4. Perforated baffles 10 and 11 are provided in the vessel 4 to ensure even flow of the benzene 12 across the vessel 4. The vessel 4 is cooled by circulation of cold water or brine through the jacket 13 in such manner as to keep the benzene 12 in the vessel 4 at a temperature below 20° C. The reaction vapours leave the pipe 6 through the nozzle 14 which causes them to impinge in fine streams on to the stream of benzene 12 in the vessel 4. The reaction vapours are condensed on coming into contact with the stream of benzene and the anhydride separated from the water to a very efficient extent, the anhydride (together with any unconverted acetic acid) dissolving in the benzene whilst the water is condensed and separated. The benzene, together with the dissolved anhydride and separated water, passes via the constant level overflow 9 and the pipe 15 to the receiver 5 wherein the liquid separates into two layers, the water forming the lower layer whilst the benzene and dissolved anhydride (and unconverted acetic acid) form the upper layer. The anhydride can readily be recovered by distillation of the upper layer.

Any uncondensable gases in the reaction vapours escape from the vessel 4 by the pipe 16 and gases so escaping may be treated in any suitable way to recover any anhydride carried over by them.

What I claim and desire to secure by Letters Patent is:—

1. Process for the manufacture of an aliphatic anhydride which comprises producing said anhydride by the thermal decomposition of the vapor of the corresponding aliphatic acid during the passage of a stream of said vapor at such rate as to convert the acid to anhydride in contact with a heated catalyst comprising carbon produced by charring a substantially pure carbohydrate.

2. Process for the manufacture of acetic anhydride which comprises producing said anhydride by the thermal decomposition of acetic acid vapor during the passage of a stream of said vapor at such rate as to convert the acid to anhydride in contact with a heated catalyst comprising carbon produced by charring a substantially pure carbohydrate.

3. Process for the manufacture of an aliphatic anhydride which comprises producing said anhydride by the thermal decomposition of the vapor of the corresponding aliphatic acid during the passage of a stream of said vapor at such rate as to convert the acid to anhydride in contact with a heated catalyst comprising carbon produced by charring a sugar.

4. Process for the manufacture of acetic anhydride which comprises producing said anhydride by the thermal decomposition of acetic acid vapor during the passage of a stream of said vapor at such rate as to convert the acid to anhydride in contact with a heated catalyst comprising carbon produced by charring a sugar.

5. Process for the manufacture of an aliphatic anhydride which comprises producing said anhydride by the thermal decomposition of the vapor of the corresponding aliphatic acid in contact with a heated catalyst comprising sodium metaphosphate and carbon produced by charring a substantially pure carbohydrate.

6. Process for the manufacture of acetic anhydride which comprises producing said anhydride by the thermal decomposition of acetic acid vapor in contact with a heated catalyst comprising sodium meta-phosphate and carbon produced by charring a substantially pure carbohydrate.

7. Process for the manufacture of an aliphatic anhydride which comprises passing an aliphatic acid vapor in contact with a heated mixture of sugar charcoal and sodium meta-phosphate which mixture has been prepared by destructive heating of a sugar and microcosmic salt.

8. Process for the manufacture of acetic anhydride which comprises passing acetic acid vapor in contact with a heated mixture of sugar charcoal and sodium meta-phosphate, which mixture has been prepared by destructive heating of sugar and microcosmic salt.

9. Process for the manufacture of aliphatic anhydride by thermal decomposition of aliphatic acid vapor, which comprises passing the aliphatic acid vapor in contact with a heated mixture of sugar charcoal and at least one phosphoric acid.

10. Process for the manufacture of acetic anhydride by thermal decomposition of acetic acid vapor, which comprises passing the acetic acid vapor in contact with a heated mixture of sugar charcoal and at least one phosphoric acid.

STANLEY JOSEPH GREEN.

CERTIFICATE OF CORRECTION.

Patent No. 1,990,902.　　　　　　　　　　　　　　　　　　February 12, 1935.

STANLEY JOSEPH GREEN.

It is hereby certified that error appears in the printed specification of the above numbered patent requiring correction as follows: Page 2, second column, line 17, strike out the words and number "Patent No. 298,667"; and that the said Letters Patent should be read with this correction therein that the same may conform to the record of the case in the Patent Office.

Signed and sealed this 19th day of March, A. D. 1935.

(Seal)
Leslie Frazer
Acting Commissioner of Patents.